United States Patent Office 2,956,081
Patented Oct. 11, 1960

2,956,081

N-AMIDO-GLYCYLAMIDES

Gerhard W. Kusserow, Santa Monica, and Marshall D. Draper, Woodland Hills, Calif., assignors to Riker Laboratories, Inc., Los Angeles, Calif., a corporation of Delaware No Drawing. Filed Sept. 12, 1957, Ser. No. 683,462

13 Claims. (Cl. 260—558)

This application is a continuation-in-part of our copending application, Serial No. 615,769, filed October 15, 1956, now abandoned.

This invention relates to novel chemical compounds having sedative or hypnotic activity. More particularly, the invention relates to novel N-amido-glycylamides and related compounds, and to processes for producing the same.

It is an object of the present invention to provide therapeutic compounds having desirable hypnotic or sedative properties and to processes for producing these compounds.

Other objects will be apparent to those skilled in the art from reading this specification.

The chemical compounds of the present invention may be represented by the following formula:

wherein $R_1$ is a lower-alkoxy-ring substituted-phenyl or styryl group wherein the number of lower alkoxy substituents per nucleus is from 1 to 3, or a halo-phenyl group, preferably a poly-lower-alkoxyphenyl group, such as a tri-lower-alkoxy-phenyl group. The symbol "$n$" represents an integer from 1 to 2, inclusive, preferably 1. $R_3$ and $R_4$ are lower alkyl groups, preferably methyl or ethyl. The expression "lower" is intended to include up to 4 carbon atoms in each alkyl or alkoxyl group.

Included among the compounds in accordance with the present invention are: 3,4,5-trimethoxybenzoylglycine diethylamide; 3,4,5-trimethoxycinnamoylglycine diethylamide; p-chlorobenzoylglycine diethylamide; anisoylglycine diethylamide; veratroylglycine diethylamide; 3,4,5-trimethoxybenzoyl-β-alanine diethylamide; veratroylglycine di-n-butylamide; 3,4,5-trimethoxybenzoylglycine dimethylamide; 3,4,5-trimethoxybenzoylglycine diisopropylamide; etc.

The compounds according to the invention have been found to possess sedative or hypnotic activity and they may be administered therapeutically in pharmaceutical forms such as solutions, tablets, capsules, etc.

The present invention also comprises the following processes for producing the compounds of the invention. The processes comprise: (1) treating an $R_1$—CO—halide with an amino acid ester and the resulting

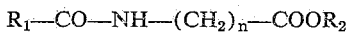

with hydrazine followed by nitrous acid to form the corresponding azide, which is then treated with an amine of the formula: $HNR_3R_4$; or (2) by employing in the first step of (1) above, an $R_1$-carboxylic acid and an amino acid ester in the presence of an N,N'-disubstituted carbodiimide, such as N,N'-dicyclohexylcarbodiimide; or (3) by treating a haloacyl halide with an amine of the formula: $HNR_3R_4$, followed by treatment of the resulting compound with an $R_1$-carboxyl amide in the presence of an alkali-metal hydride, such as sodium hydride; or (4) by treating an $R_1$-acyl halide with an amino acid ester and treating the resulting product with an amine of the formula: $HNR_3R_4$; or (5) by treating a compound of the formula: $H_2N$—$(CH_2)_n$—$CO$—$NR_3R_4$ with an $R_1$-acyl halide. In this description $n$, $R_1$, $R_3$ and $R_4$ have the same meaning as given hereinabove.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims.

EXAMPLE 1

(A) *3,4,5-trimethoxybenzoic acid amide of glycine ethyl ester*

About 10 gms. of glycine ethyl ester hydrochloride was slurried with 50 ml. of tetrahydrofuran and anhydrous ammonia was bubbled into the mixture for 20 minutes. The resulting ammonium chloride was removed by filtration. The excess ammonia was removed by vacuum evaporation of the tetrahydrofuran solution to a volume of 25 ml. About 15 gms. of 3,4,5-trimethoxybenzoic acid was added to the solution, and 1.5 gms. of N,N'-dicyclohexylcarbodiimide in 10 ml. of tetrahydrofuran was added subsequently. The mixture was allowed to stand for 4 hours and the N,N'-dicyclohexylurea (11 gms.) which formed was removed by filtration. The tetrahydrofuran was removed by vacuum and 25 ml. of diethylether was added to the residual oil. Crystallization occurred rapidly. The yield of crystals constituted 12.8 gms. of crude 3,4,5-trimethoxybenzoic acid amide of glycine ethyl ester. When recrystallized from diethyl ether the product had a melting point of 109–110° C.

(B) *Hydrazide of glycine 3,4,5-trimethoxybenzoic acid amide*

About 2.0 gms. of 3,4,5-trimethoxybenzoic acid amide of glycine ethyl ester, 0.5 gm. of hydrazine hydrate (85%) and 20 ml. of ethanol were placed in a 50 ml. flask, the flask stoppered and allowed to stand overnight at room temperature. About 25 ml. of diethyl ether was added to the mixture which had formed a crystalline mass and the crystals were removed by filtration. The yield was 1.88 gms. of material having a melting point of 164–165° C.

(C) *N-3,4,5-trimethoxybenzoylglycine diethylamide*

About 1.88 gms. of the hydrazide produced in part B was dissolved in 66.5 ml. of 0.1 N hydrochloric acid and the solution cooled to 0° C. in an ice-salt bath. About 7.0 ml. of 1 N sodium nitrite solution previously cooled to 0° C. was added all at once and 66.5 ml. of 0.1 N hydrochloric acid having a temperature of 0° C. added. The mixture was stirred for 5 minutes and extracted immediately with 3 portions of 25 ml. each of chloroform. About 0.55 gm. of diethylamine was added to the collected cold chloroform solution and the mixture was allowed to stand in the dark overnight. The chloroform was removed in vacuum and ether added to the oily residue which crystallized immediately. The yield was 1.86 gms. having a melting point of 123–127° C. The product was recrystallized from methanol-ether and then had a melting point of 132–133.5° C.

This compound, when administered orally to cats and dogs at a dosage of 50 to 100 mgm. per kgm. induced sleep. The animal data indicate that even at ten times the minimal hypnotic dose (MHD) the degree of central nervous system depression was no greater than at the MHD. Side effects were minimal even at ten to fifteen times the MHD. The compound has a unique advantage over other hypnotics in that it does not show disturbance of the normal sleep pattern as indicated by electroencephalographic studies in humans. The compound did not show the "spindling" or other medication artifacts seen with the barbiturates.

EXAMPLE 2

N-3,4,5-trimethoxybenzoyl-B-alanine diethylamide

About 14 grams of 3,4,5-trimethoxybenzoic acid was converted to the acid chloride by refluxing it under anhydrous conditions in 250 ml. dry benzene and 15 ml. of thionyl chloride for a period of two hours. At the end of this time the reaction mixture was concentrated to dryness under vacuum on a steam bath to yield a purple tinged white powder.

For conversion to the amide, the acid chloride was dissolved in 50 ml. dry pyridine and to this was added 9.5 grams of N,N'-diethyl-B-alanine amide. The reaction mixture was allowed to heat under anhydrous conditions on the steam bath for one-half hour and was then poured over ice in a beaker. The solution was made acid to Congo red with concentrated hydrochloric acid and extracted twice with benzene. The benzene extracts were then washed twice with dilute sodium carbonate solution, filtered through anhydrous sodium sulfate and evaporated to dryness under vacuum. On standing overnight, crystals formed from the viscous liquid. These were recovered and dried. A yield of 7.5 grams of crystals having a melting point of 102–105° C. was obtained.

The product was recrystallized by dissolving it in 100 ml. hot benzene and diluting the solution with Skellysolve B (a petroleum fraction consisting primarily of hexanes and heptanes) until a faint turbidity appeared. On standing, crystals formed. The crystals weighed 7.0 grams and had a melting point of 105–107° C. (with slow preliminary softening).

EXAMPLE 3

N-p-chlorobenzoylglycine diethylamide

About 10 grams of p-chlorobenzoylchloride and 10 grams of glycine ethyl ester hydrochloride were dissolved in 50 ml. of pyridine. The temperature of the solution was maintained at approximately 50° C. for two hours. The p-chlorobenzoylglycine ethyl ester was isolated by the procedure described for the islation of N-3,4,5-trimethoxybenzoyl-B-alanine diethylamide in Example 2.

About 2 grams of the p-chlorobenzoylglycine ethyl ester was dissolved in 20 ml. diethylamine and allowed to stand at room temperature for about three weeks or until no more material separated. The precipitate was filtered off and recrystallized from methyl alcohol. The white crystalline compound obtained melted at 98–100° C.

EXAMPLE 4

N-3,4,5-trimethoxycinnamoylglycine diethylamide

About 19 grams of 3,4,5-trimethoxycinnamic acid was converted to the acid chloride by refluxing it for two and one-half hours in 250 ml. of benzene and 20 ml. of thionyl chloride. The solution was concentrated on a steam bath in vacuum to give a liquor which crystallized on cooling. Then 10 grams of glycine diethylamide and 25 ml. of pyridine were added and the mixture was allowed to stand overnight. The mixture was then neutralized and the product recovered, extracting the reaction mixture with benzene. The benzene extract was washed with dilute (5%) sodium hydroxide and dried. A yield of 16 grams of needle shaped crystals was obtained, having a melting point of 128–129° C.

EXAMPLE 5

N-anisoylglycine diethylamide

About 10 grams of anisic acid (0.0655 mole) was dissolved in 15 ml. of dry benzene. To this was added 15.5 grams of thionyl chloride (0.13 mole) and the mixture was refluxed for two hours in a hood. The excess thionyl chloride and benzene were distilled off and 25 ml. of dry pyridine added to the residue. Then 8.5 grams of glycine diethylamide was added to the resulting solution of anisoyl chloride and the solution heated on the steam bath for one hour. The mixture was then poured into an excess of water and extracted with benzene. The benzene extract was washed once with dilute hydrochloric acid, once with sodium bicarbonate and finally with water, dried over anhydrous sodium sulfate and the benzene distilled off. The yield was 15 grams. After the product was recrystallized from a mixture of benzene and Skellysolve B, it had a melting point of 81.4–84° C.

EXAMPLE 6

N-veratroylglycine diethylamide

About 20 grams of veratric acid was converted to the acid chloride employing the procedure described in Example 5 for producing the acid chloride of anisic acid. The latter was added to 50 ml. of pyridine and 14.3 grams of glycine diethylamide.

The resulting solution was heated for one-half hour on the steam bath. The product was recovered and isolated in accordance with the procedure described in Example 5.

EXAMPLE 7

N-3,4,5-trimethoxylbenzoylglycine diethylamide

To 250 ml. of dry benzene was added 11.8 grams of a 50% sodium hydride dispersion in mineral oil. After the evolution of hydrogen had ceased, 25 grams of 3,4,5-trimethoxybenzamide was added and the mixture heated on the steam bath. After complete formation of the sodio derivative of 3,4,5-trimethoxybenzamide (one and one-half hours on the steam bath), 26.1 grams of diethylchloroacetamide was added. The mixture was refluxed for two and one-hours, then poured onto ice and the benzene phase was separated. The aqueous phase was further extracted with 250 ml. of chloroform. The combined benzene and chloroform phases were dried over magnesium sulfate, filtered and the solvents removed under vacuum. The residue was washed with pentane (to remove mineral oil) and then crystallized from ether to afford a 57% yield of crystalline material having a melting point of 132–133° C.

EXAMPLE 8

N-veratroylglycine di-n-butylamide

About 14 grams of veratric acid were converted to its glycine hydrazide in accordance with the procedure described in Example 1, to produce the N-veratroylglycine hydrazide. About 8.9 grams of the hydrazide were dissolved in 350 ml. of approximately 1/10 N hydrochloric acid and cooled in an ice-salt mixture. Then 2.3 grams of sodium nitrite in approximately 50 ml. of water and an additional 320 ml. of cold 1/10 N hydrochloric acid were added. The solution was kept cold, permitted to stand for approximately ten minutes and extracted with five 50 ml. portions of chloroform. The combined chloroform extracts were washed with water and dried over anhydrous sodium sulfate. There was then added to the dried chloroform extracts 3 grams of di-n-butylamine. After a few more hours the chloroform solution was concentrated and ether added to give a crystalline precipitate.

EXAMPLE 9

N-3,4,5-trimethoxybenzoylglycine dimethylamide

About 7 grams of 3,4,5-trimethoxybenzoylglycine hydrazide was dissolved in 250 ml. of 0.1 N hydrochloric acid and the resulting solution cooled in an ice-salt bath. About 1.9 grams of sodium nitrite dissolved in 50 ml. of water and an additional portion of 250 ml. of 0.1 N hydrochloric acid was added. The solution was kept in the cooling bath and swirled for ten minutes; at the end of this time the slushy mixture was extracted six times with one-third volume portions of chloroform. The chloroform extracts were backwashed once with water and then filtered through anhydrous sodium sulfate. A ten molar excess of a dilute aqueous dimethylamine solution was extracted with chloroform and after being dried over anhydrous sodium sulfate, the dried extract was added to the red chloroform solution of the azide obtained above. The color of the solution changed from red to yellow and after standing for four hours at room temperature, the mixture was dried in vacuo. The addition of a small amount of ethyl ether to the solution resulted in the formation of 7 grams of needles. These were recrystallized by dissolving in chloroform and adding ether. The product had a melting point of 119–120° C.

EXAMPLE 10

N-3,4,5-trimethoxybenzoylglycine di-isopropylamide (I)—*Glycine di-isopropylamide.* About 41 grams (0.41 mole) of di-isopropylamine were added to 92.5 grams (0.41 mole) of phthaloyl glycine acid chloride in 200 ml. of dry pyridine. The reaction mixture was heated for 1 hour on a steam bath and then allowed to stand at room temperature overnight. The reaction mixture was poured into an equal volume of water and then the aqueous solution extracted with 2-portions of equal volumes of benzene. The benzene extracts were combined and washed successively with dilute hydrochloric acid, dilute aqueous sodium bicarbonate and finally with water. After drying the benzene solution over anhydrous sodium sulfate the benzene was distilled under reduced pressure, yielding a black residue. Subsequent treatment with charcoal and then several recrystallizations from chloroform by adding diethyl ether yielded 31.5 grams of material having a melting point of 184–185° C. which was phthaloyl glycyl di-isopropylamide.

(II) About 20 grams (0.069 mole) of the above prepared amide was dissolved in 150 ml. of methanol and to it was then added 8.5 ml. of 85% hydrazine hydrate. Heating the solution on a steam bath resulted in a crystalline mass of the hydrazide in about one-half hour. Heating was continued for an additional hour and one-half. After the heating period, the slurry was cooled to 20° C. and filtered and washed with a small amount of methanol. The hydrazide was found to be quite soluble in methanol so the combined washings and filtrate were taken to dryness under vacuum. The crystals were combined with the residue by dissolving in chloroform, the chloroform solution washed with 5% aqueous solution of sodium hydroxide, then water, and then dried with anhydrous sodium sulfate. The chloroform was distilled off under aspirator pressure to yield 9.4 grams (85% of theory) of crude glycine di-isopropylamide.

(III) — *3,4,5 - trimethoxybenzoylglycine di - isopropylamide.*—About 9.4 grams of the crude di-isopropyl glycyl amide produced above was dissolved in 75 ml. of acetone and 31.5 ml. of 2 N aqueous sodium hydroxide solution. This solution was then cooled in an ice-bath and the temperature maintained at or below 5° C., while 14.4 grams of 3,4,5-trimethoxy benzoyl chloride in 75 ml. of acetone was added with stirring (pH at end was near 7). The resulting reaction mixture was then concentrated by evaporation, extracted with diethyl ether and the ether extract washed with small successive volumes of dilute hydrochloric acid, sodium bicarbonate and water. After drying the ether extract with anhydrous sodium sulfate, the ether was distilled off, leaving a brown crystalline residue. Crystallization and subsequent recrystallization from a benzene Skelly B mixture yielded 8.5 grams (31.5% yield) of buff colored crystals, having a melting point of 152–154° C.

EXAMPLE 11

N-3,4,5-trimethoxybenzoylglycine diethylamide

A solution was prepared by mixing 2.2 grams of 3,4,5-trimethoxybenzoic acid, 1.3 grams of glycine diethylamide and 2.1 grams of N,N'-dicyclohexylcarbodiimide in 5 ml. of tetrahydrofuran. The resulting solution was permitted to stand overnight at room temperature. The heavy precipitate which formed and which constituted 2.3 grams of impure N,N'-dicyclohexylurea was filtered off and the filtrate evaporated to produce a colorless oil weighing 3.5 grams. The oil crystallized to yield 3.0 grams of N-3,4,5-trimethoxybenzoylglycine diethylamide crystals.

The compounds of the present invention may be incorporated into pharmaceutical preparations in the form of solutions, tablets, capsules, etc. Below is an example of a suitable tablet composition, employing a compound according to the invention:

EXAMPLE 12

Each tablet contained the following composition:

| | Milligrams per Tablet |
|---|---|
| N-3,4,5-trimethoxybenzoylglycine diethylamide (Example 1) | 250 |
| Corn starch, U.S.P. | 80 |
| Dibasic calcium phosphate, U.S.P. | 100 |
| Gelatin, U.S.P | 16 |
| Calcium stearate, pharmaceutical grade | 4 |
| | 450 |

The tablets were produced by mixing the active compound with the starch and dibasic calcium phosphate. The blended powders were granulated with gelatin solution and passed through a screen and dried. The dried granules were screened, a tabletting lubricant and starch were added, and tablets compressed.

The compounds of the present invention have been found useful in the following clinical states: insomnia, nervous tension, acute anxiety states, epilepsy (grand mal especially), as an adjunct in general anesthesia, and as an adjunct in taking electroencephalograms.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention disclosed.

What is claimed is:
1. A compound of the formula:

$$R_1-CO-NH-(CH_2)_n-CO-NR_3R_4$$

wherein $R_1$ is a member selected from the class consisting of mono- and poly- lower-alkoxy-ring substituted-phenyl and cinnamenyl groups, and the chlorophenyl group, $n$ is an integer from 1 to 2, inclusive, $R_3$ and $R_4$ are lower alkyl groups; the number of lower alkoxy groups being from 1 to 3 per phenyl nucleus.

2. A compound according to claim 1 wherein $R_1$ is the poly-lower-alkoxy-phenyl group.

3. A compound according to claim 1 wherein $R_1$ is the poly-lower-alkoxy-cinnamenyl group.

4. A compound according to claim 1 wherein $R_3$ and $R_4$ are lower alkyl groups containing up to 2 carbon atoms each, inclusive.

5. The compound 3,4,5-trimethoxybenzoylglycine diethylamide.

6. The compound 3,4,5-trimethoxycinnamoylglycine diethylamide.

7. The compound p-chlorobenzoylglycine diethylamide.

8. The compound anisoylglycine diethylamide.

9. The compound veratroylglycine diethylamide.

10. The compound 3,4,5 - trimethoxybenzoyl - B - alanine diethylamide.

11. The compound 3,4,5-trimethoxybenzoylglycine dimethylamide.

12. The compound 3,4,5-trimethoxybenzoylglycine-diisopropylamide.

13. The compound veratroylglycine-di-n-butylamide.

References Cited in the file of this patent

UNITED STATES PATENTS

| | | |
|---|---|---|
| 2,103,265 | Lott | Dec. 28, 1937 |
| 2,447,587 | Martin et al. | Aug. 24, 1948 |
| 2,496,882 | Martin et al. | Feb. 7, 1950 |
| 2,520,917 | Dickey et al. | Sept. 5, 1950 |
| 2,677,697 | Lott | May 4, 1954 |
| 2,819,305 | Lott | Jan. 7, 1958 |

FOREIGN PATENTS

| | | |
|---|---|---|
| 403,892 | Great Britain | Jan. 4, 1934 |

OTHER REFERENCES

Bergman et al.: J. Biol. Chem., vol. 113, pp. 341–57 (1936).

Curtius: J. Prak [2] vol. 89, p. 449 (1914).

Landsteiner et al.: J. Exptl. Med., vol. 69, pp. 705–719 (1939).

Theilheimer: Synthetic Methods of Org. Chem., vol. 1 (1942–1944), page 107.